United States Patent [19]

Tagamolila et al.

[11] Patent Number: 5,768,904
[45] Date of Patent: Jun. 23, 1998

[54] PROCESSES FOR INTEGRATING A CONTINUOUS SORPTION COOLING PROCESS WITH AN EXTERNAL PROCESS

[75] Inventors: Constante P. Tagamolila, Arlington Heights; Stephen R. Dunne, Algonquin, both of Ill.

[73] Assignee: UOP LLC, Des Plaines, Ill.

[21] Appl. No.: 850,402

[22] Filed: May 2, 1997

[51] Int. Cl.$^6$ .................................................. F25B 27/00
[52] U.S. Cl. .............................. 62/238.3; 62/480; 62/106
[58] Field of Search .............................. 62/238.3, 238.1, 62/101, 106, 476, 480, 148

[56] References Cited

U.S. PATENT DOCUMENTS

| | | | |
|---|---|---|---|
| 2,726,519 | 12/1955 | Squier | 62/238.3 |
| 4,138,850 | 2/1979 | Tchernev | 60/641 |
| 4,548,046 | 10/1985 | Brandon | 62/79 |
| 4,610,148 | 9/1986 | Shelton | 62/480 |
| 4,637,218 | 1/1987 | Tchernev | 62/106 |
| 4,660,629 | 4/1987 | Maier-Laxhuber et al. | 165/104 |
| 4,780,967 | 11/1988 | Mucic | 34/86 |
| 5,279,359 | 1/1994 | Erickson | 165/104.12 |
| 5,345,786 | 9/1994 | Yoda et al. | 62/476 |
| 5,388,637 | 2/1995 | Jones et al. | 165/194.12 |
| 5,477,705 | 12/1995 | Meunier | 62/480 |
| 5,518,977 | 5/1996 | Dunne et al. | 502/68 |
| 5,585,145 | 12/1996 | Maier-Laxhuber et al. | 427/380 |

OTHER PUBLICATIONS

Aittomäki, A. and Härkönen, presented an article titled, "Internal Regeneration of the Adsorption Process," presented at the Solid Sorption Refrigeration Symposium –Paris, France, Nov. 18–20, 1992.

Chang, S.C. and Roux, J.A., article titled, "Thermodynamic Analysis of a Solar Zeolite Refrigeration System," in the Journal of Solar Energy Engineering, Aug. 1985, vol. 107, pp. 189–194.

Meyers, Robert A., editor, Chapter 3.3 of Handbookk of Petroleum Refining Processes, Second Edition, published by Mc–Graw Hill, NY 1996.

*Primary Examiner*—William Doerrler
*Attorney, Agent, or Firm*—Thomas K. McBride; John G. Tolomei; Richard P. Silverman

[57] ABSTRACT

A process and a control system are disclosed for continuous cooling of a condensable process stream by the integration of a sorption cooling section for producing a chilled stream therewith. The condensable process stream is cooled with a cooled hot exit stream from the sorption cooling section to provide a hot working fluid stream to desorb an adsorption zone in the sorption cooling zone. A cold working fluid stream comprising a condensed portion of the condensable stream is passed to the sorption cooling section to facilitate adsorption in another adsorption zone in the sorption cooling section and a warm exit stream is withdrawn. The hot exit stream and the warm exit stream are cross-exchanged to smooth out the temperature variations which reduce the size and operating cost of producing the chilled stream. Potential damage to equipment and variation operations can be avoided by comparing the pressure of the condensable process stream to the pressure of the condensed portion and admixing a portion of the condensable stream with the condensed portion. The process provides significant economic benefits operating cost savings in refinery and petrochemical applications where fractionation column overhead vapors or flue gases are available at waste heat temperatures above about 80° C. (176° F.) such as fluid catalytic cracking, crude phenol fractionation, benzene, toluene, xylene, ethylbenzene, and cumene columns and naphtha splitter columns.

26 Claims, 6 Drawing Sheets

PROCESSES FOR INTEGRATING A CONTINUOUS SORPTION COOLING PROCESS WITH AN EXTERNAL PROCESS

FIELD OF THE INVENTION

The present invention relates to a process for heating or cooling of a fluid stream by adsorption of a refrigerating fluid on a solid adsorbent. More particularly, the invention relates to a process and system for the integration of a sorption cooling and sorption heating system within a continuous external process.

BACKGROUND OF THE INVENTION

Heat driven heat pumps which use solid adsorbent beds to adsorb and desorb a refrigerant are known in the art. These solid adsorbent beds adsorb and desorb a refrigerant vapor in response to changes in the temperature of the adsorbent. One common example of such solid adsorbent material is a molecular sieve, such as a zeolite. Other materials which exhibit this phenomena are silica gel, alumina, activated charcoal, and some metal salts. Most any liquid which can be vaporized can be employed as the refrigerant. Water is commonly used as a refrigerant when zeolite is the solid adsorbent.

In the operation of sorption cooling systems, generally there are two or more solid beds containing a solid adsorbent. The solid adsorbent beds desorb refrigerant when heated and adsorb refrigerant vapor when cooled. In this manner the beds can be used to drive the refrigerant around a heat pump system to heat or cool another fluid such as a process stream or to provide space heating or cooling. In the heat pump system, commonly referred to as the heat pump loop, or a sorption refrigeration circuit, the refrigerant is desorbed from a first bed as it is heated to drive the refrigerant out of the first bed and the refrigerant vapor is conveyed to a condenser. In the condenser, the refrigerant vapor is cooled and condensed. The refrigerant condensate is then expanded to a lower pressure through an expansion valve and the low pressure condensate passes to an evaporator where the low pressure condensate is heat exchanged with the process stream or space to be conditioned to revaporize the condensate. When further heating no longer produces desorbed refrigerant from the first bed, the first bed is isolated and allowed to return to the adsorption conditions. When the adsorption conditions are established in the first bed, the refrigerant vapor from the evaporator is reintroduced to the first bed to complete the cycle. Generally two or more solid adsorbent beds are employed in a typical cycle wherein one bed is heated during the desorption stroke and the other bed is cooled during the adsorption stroke. The time for the completion of a full cycle of adsorption and desorption is known as the "cycle time." The heating and cooling steps are reversed when the beds reach the desired upper and lower temperature limits of the adsorption cycle. The upper and lower temperatures will vary depending upon the selection of the refrigerant fluid and the adsorbent. The efficiency in cooling is called the "coefficient of performance" (COP) and is generally the ratio of the cooling effect divided by the heat input. The thermodynamic aspects of developing a zeolite-water adsorption refrigeration unit are well known. An article entitled, "Thermodynamic Analysis of a Solar Zeolite Refrigeration System," by S. Chang and J. A. Roux, which appeared in the Journal of Solar Energy Engineering, Aug. 1985, Volume 107, pages 189–194, provides a discussion of the main parameters, including adsorber properties.

U.S. Pat. No. 4,610,148 to Shelton discloses a heat driven heat pump system wherein a temperature gradient is established lengthwise in the solid adsorbent bed in order to establish a thermal wave in the bed. As a heat transfer fluid is circulated through the system by a reversible pumping means, the beds are cycled between an upper and a lower operating temperature, creating the thermal wave within the bed of solid adsorbent. The heat transfer fluid always flows serially from a heater through a bed heat exchanger heating that bed while cooling the heat transfer fluid. Then the heat transfer fluid is passed through the cooling heat exchanger to further cool the heat transfer fluid, and the further cooled heat transfer fluid is passed through the other bed heat exchanger to cool that bed while heating the heat transfer fluid. Finally, the thus heated heat transfer fluid is returned to the heater to raise the heat transfer fluid to the original temperature. The solid adsorbent beds are constructed of one or more tubes through which the heat transfer fluid is passed and around which the solid adsorbent is held by a housing shell. In a similar apparatus for use with an ammonia refrigerant, U.S. Pat. No. 5,388,637 discloses the use of a filed tube matrix comprising a bonded activated carbon and a resol bonder tightly adjoined to the fins of the tube to provide high rates of heat transfer between the refrigerant and the heat transfer fluid.

Some thermodynamic processes for cooling and heating by adsorption of a refrigerating fluid on a solid adsorbent use zeolite and other sorption materials such as activated carbon and silica gel. In these processes, the thermal energy from adsorbing zeolite in one zone is used to heat desorbing zeolite located in another zone. U.S. Pat. No. 4,138,850 relates to a system for solar heat utilization employing a solid zeolite adsorbent mixed with a binder, pressed, and sintered into divider panels and hermetically sealed in containers. The U.S. Pat. No. 4,637,218 to Tchernev relates to a heat pump system using zeolites as the solid adsorbent and water as the refrigerant wherein the zeolite is sliced into bricks or pressed into a desired configuration to establish an hermetically sealed space and thereby set up the propagation of a temperature front, or thermal wave through the adsorbent bed. The bricks used in U.S. Pat. No. 4,637,218 are preferably not more than 10 mm in thickness. U.S. Pat. No. 5,477,705 discloses an apparatus for refrigeration employing a compartmentalized reactor and alternate circulation of hot and cold fluids to create a thermal wave which passes through the compartments containing a solid adsorbent to desorb and adsorb a refrigerant.

U.S. Pat. No. 4,548,046 relates to an apparatus for cooling or heating by adsorption of a refrigerating fluid on a solid adsorbent. The operations employ a plurality of tubes provided with parallel radial fins, the spaces between which are filled or covered with solid adsorbent such as Zeolite 13X located on the outside of the tubes.

In an article by Aittomaecki, A. and Haerkoenen, M., titled, "Internal Regeneration of the Adsorption Process," and presented at the Solid Sorption Refrigeration Symposium—Paris, France, Nov. 18–20, 1992, the authors indicate that there is a draw back to the Tchernev/Shelton cycle which creates a thermal wave in the bed traveling in the direction of the flow of the heat transfer fluid. Aittomaecki et al. notes that the cycle time must be short enough to maintain the operation temperatures of the outflowing fluids at the desired level; however, short cycles decrease the net adsorption and lead to a decrease in the COP of the basic process. Thus, there are finite limits to the thermal wave processes which must have a cycle time long enough to maintain adsorbent regeneration efficiency, but short enough to maintain the overall COP.

U.S. Pat. No. 5,279,359 to Erickson discloses an apparatus and a process for sorption heat pumping using a multiplicity of intermittent cyclic triplex sorption modules. The cyclic triplex sorption modules comprise hermetically sealed tubes, each of which contains at least two solid sorbents and is filled with a refrigerant. The preferred refrigerant is ammonia and the solid sorbents are salts such as $BaCl_2$, $SiCl_2$, $CaCl_2$, $MnCl_2$, $FeCl_2$ and $SiBr_2$.

U.S. Pat. No. 4,660,629 to Maier-Laxhuber et al. discloses a continuous adsorption cooling device comprising a plurality of adsorption containers filled with adsorbent wherein the adsorption containers are rotated through flow segments which form passageways for a heat carrier stream. The adsorption containers contain an adsorption substance from which an operating substance is extracted by absorbing heat from a heat carrier flow and into which the operating substance is readsorbed, emitting heat to a further heat carrier flow.

Refining processes which are highly thermally integrated represent a significant opportunity for employing sorption cooling systems to recover heat in one portion of a process and provide cooling in another portion of the process. Applications of sorption cooling to such large energy consuming processes have been limited for the reason that variations in temperature in a highly thermally integrated process can not be tolerated, particularly where those variations in temperature may cause a process stream to condense thereby resulting in an upset of the operation of the process.

Prior methods of using zeolite adsorbents in devices for cooling or heating by adsorption of a refrigerating fluid on a solid adsorbent have been inefficient and difficult to prepare. Those methods of preparation included cutting natural rock into thin bricks and mounting these bricks on to heat exchange surfaces or casting powdered zeolites and mixtures thereof with clays into panels or slabs for direct contact with fluids. Prior devices have sought to minimize heat transfer losses in systems for sorption cooling by employing flat containers filled with adsorbent suspended in heat carrier streams or with slabs of adsorbent wired or mounted next to heat transfer surfaces. In one case, finned tubing was employed as a support for a resin bonded adsorbent to provide more thermal conductivity to the adsorbent. Many of these devices incorporated further flow enhancers such as sorbate conduits, weirs, valves, and wicks to establish maximum contact of the operating fluid and the adsorbent with heat exchange surfaces. These devices are limited by their ability to maintain the regenerating efficiency of the adsorbent and their ability to provide continuous heat transfer between an external process and the sorption cooling system.

It is the object of the instant invention to provide an improved sorption cooling system for use in the process industries which is not limited by the regeneration efficiency of the adsorbent.

Unlike simple space or water heating systems wherein some variation in delivered temperature is tolerated or even expected, in the process industry variation in temperature of process streams can result in unacceptable variations in product composition or yield. Therefore, methods are sought which provide low cost heat recovery with sorption cooling systems integrated in such a manner to provide an overall stable, continuous operation.

SUMMARY OF THE INVENTION

Application of sorption cooling techniques to the process industry has been limited by the ability to integrate the dynamic nature of the sorption cooling systems with the steady-state, continuous nature of hydrocarbon processing. Examples of petroleum refining and petrochemical processes in which sorption cooling systems of the present invention may be incorporated include processes such as fluid catalytic cracking (FCC), which is described in Chapter 3.3 of *Handbook of Petroleum Refining Processes,* Second Edition, edited by Robert A. Meyers, published by McGraw-Hill, New York 1996, and is herein incorporated by reference. The present invention provides a cost effective means for integrating sorption cooling systems in an indirect fashion by employing a working fluid to transfer heat between the sorption cooling system and the process and by a direct means wherein the process stream is employed to provide both the hot source stream and the cold source stream of the sorption cooling system resulting in improved overall operation, an uncomplicated design, lower capital costs, and lower operating costs than conventional approaches.

In one embodiment, the present invention relates to a process for continuous cooling of a condensable process stream with a sorption cooling system for producing a separate chilled stream. The process comprises the following steps. The condensable process stream is passed to a hot source exchanger and therein the condensable process stream is cooled by indirect heat exchange with a heated warm exit stream to provide a cooled condensable process stream and a hot working fluid stream. The hot working fluid stream and a cold working fluid stream are passed to the sorption cooling system and a hot exit stream and a warm exit stream are withdrawn therefrom. The hot exit stream is heat exchanged by indirect heat exchange with at least a portion of the warm exit stream in an intermediate heat exchanger to provide the cooled hot exit stream and a heated warm exit stream, and the cooled hot exit stream is cooled to provide the cold working fluid stream.

In another embodiment the invention relates to a process for producing a chilled water stream from a continuous sorption cooling section of a fluid catalytic cracking (FCC) unit. The process comprises a series of steps. A cold working fluid stream, a hot working fluid stream, and a cooling water stream are passed to the sorption cooling section and a hot exit stream, a warm exit stream, and the chilled water stream are withdrawn. The hot exit stream is heat exchanged by indirect heat exchange with the warm exit stream in an intermediate exchanger to provide a cooled hot exit stream and a heated warm exit stream. An FCC reactor effluent stream is fractionated in a fractionation zone and an overhead stream is withdrawn. The overhead stream is cooled by indirect heat exchange with a portion of the heated warm exit stream to provide the hot working fluid stream and a cooled overhead stream. At least a portion of the heated warm exit stream is returned to the fractionation zone as a reflux stream, and the cooled hot exit stream is admixed with the cooled overhead stream. A liquid condensate stream is recovered from the cooled overhead stream and at least a portion of the liquid condensate stream is returned to the sorption cooling section as the cold working fluid stream.

In a further embodiment, the invention relates to a process for producing a chilled water stream from a continuous sorption cooling section of a fluid catalytic cracking (FCC) unit. The process comprises a series of steps. An FCC reactor effluent stream is fractionated in a fractionation zone and a condensable overhead stream comprising $C_1$–$C_8$ hydrocarbons is withdrawn. The condensable overhead stream is passed to the continuous sorption cooling section as the hot working fluid stream. The hot working fluid stream is employed to desorb an adsorption zone within the continuous sorption cooling section and a hot exit stream is withdrawn. The hot exit stream is heat exchanged by indirect heat exchange with a warm exit stream withdrawn from the sorption cooling section. The cooled hot exit stream is further cooled in a condenser to provide a partially condensed stream. The partially condensed stream is passed to an accumulator and a liquid hydrocarbon stream is withdrawn from the accumulator. At least a portion of the liquid hydrocarbon stream is withdrawn as a liquid product stream and at least a portion of the liquid hydrocarbon stream is returned to the continuous sorption cooling section as a cold working fluid stream. The cold working fluid is used to cool another adsorption zone within the sorption cooling section and the warm exit stream is withdrawn therefrom. At least a portion of the heated warm exit stream is passed to the fractionation zone as a reflux stream.

In a still further embodiment, the present invention relates to a control system for integrating a continuous sorption cooling section with a fractionator producing a condensable overhead stream wherein the condensable overhead stream is essentially totally condensable. The control system comprises a series of steps. A portion of the overhead stream at an overhead pressure is passed to the sorption cooling section to desorb an adsorption zone therein and a hot exit stream is withdrawn. The hot exit stream is heat exchanged by indirect heat exchange with a warm exit stream withdrawn from another adsorption zone at a warm exit zone pressure of the sorption cooling section to provide a cooled hot exit stream and a heated warm exit stream. The heated warm exit stream is returned to the fractionation zone as a reflux stream at a reflux pressure. The cooled hot exit stream is further cooled in a condenser to provide a partially condensed stream at a condenser pressure and a liquid stream is separated from the condensed stream. A differential pressure is determined between the overhead pressure and the condenser pressure and a portion of the overhead stream is admixed with the partially condensed stream to maintain the overhead pressure in the fractionation zone.

The sorption cooling section of the present invention comprises at least two sorption zones. Each sorption zone has a heat exchange zone and an adsorption zone containing a solid adsorbent. The heat exchange zone is in intimate thermal contact with the adsorption zone, each adsorption zone is in fluid communication with a condenser and an evaporator in a sorption refrigeration circuit such that desorbed refrigerant vapor can flow from the adsorption zone being heated into the condenser and a vaporized refrigerant from the evaporator can flow into the adsorption zone being cooled. The heating and cooling of a first sorption zone and a second sorption zone with the hot working fluid stream and the cold working fluid stream is alternated to provide continuous sorption cooling of the separate chilled stream.

DETAILED DESCRIPTION OF THE INVENTION

Sorption cooling systems are generally designed for a combination of the sorbent and a refrigerant because this combination establishes the adsorption and desorption temperatures which the sorbent must attain to either adsorb the refrigerant or desorb the refrigerant. In addition, because sorbent loading is dependent on the concentration of the refrigerant over the adsorbent at any point in the cycle, the selection of the refrigerant effectively establishes the pressure range of operation in the sorption refrigeration circuit. For example, a zeolite-water pair effectively sets the temperature range between the adsorption temperature and the desorption temperature at between about 0° C. and about 200° C. and the operating pressure within the refrigeration circuit from about 0.5 kPa (5 torr) to about 4 kPa (40 torr). When ammonia or propane is employed as the refrigerant over zeolite, the operating pressure ranges from about 315 kPa (45 psia) to about 1.2 MPa (165 psia).

Adsorbents may be employed in packed beds with heat transfer surfaces such as tubes or channels passing therethrough, or the adsorbent may be applied directly to heat transfer surfaces such as tubes or plates. When the adsorbent is applied directly to the heat transfer surfaces as disclosed in Dunne et al. in U.S. Pat. No. 5,518,977, higher heat and mass transfer rates are achievable, which results in a higher overall efficiency.

Preferably the adsorbent of the present invention is disposed in an adsorbent-substrate composite which bonded to the surface of the metal forming a coating consisting essentially of the adsorbent and a binder. These coatings provide a high surface area as well as a minimum diffusion path for the components adsorbed on the adsorbent and hence, superior rates of adsorption compared to pellets or beaded forms of adsorbent. Moreover, the adsorbent coatings have excellent physical durability and are resistant to flaking. Furthermore, despite differences in the thermal expansion properties between the adsorbent and the metallic substrate, the adsorbent coatings of the present invention advantageously retain their physical integrity even after repeated thermal cycling. In addition, when the present invention is employed in heat transfer equipment and the adsorbent layer has a uniform thickness ranging from 0.1 to 3.0 mm, and preferably the uniform thickness ranges from 0.1 to 1.2 mm, the adsorbent coating provides an acceptably small thermal resistance. With the very small thermal resistance, the adsorbent zones of the present invention do not exhibit the thermal inertia or thermal wave property of the prior art. In the present invention, there is essentially no difference between the temperature of the adsorbent at an inlet end of a section of adsorbent coated tubing and the temperature at an outlet end of the same section. Thus, the temperature of the coated tubing is essentially the same across the entire length of the adsorbent coated tubing.

It is believed that the high specific power of the present invention is due in large part to the use of relatively low inventories of molecular sieve in the adsorption zones which are in intimate thermal contact with the heat transfer zone of each sorption zone. The term "specific power" means the total cooling power divided by the adsorbent inventory where the total cooling power is the rate at which heat is removed from the system. When coatings of molecular sieve materials are employed on the heat transfer surfaces, the amount of heat transferred to the molecular sieve per unit time is dependent upon the thickness of the adsorbent material. The thickness of the adsorbent material relates to the sorption cooling process, in particular to the regeneration efficiency, by providing heat transfer resistance to the transfer of heat from the hot fluid to the molecular sieve and by providing mass transfer resistance to the desorbed refrigerant. Both the heat transfer resistance and the mass transfer resistance of the molecular sieve increase by the square of the thickness of the molecular sieve coating on the heat transfer surface. In fixed beds, or matrices of adsorbents where thermal waves are established, only a small portion along the length of the heat transfer surface (or length of bed) are actively employed at the appropriate desorption conditions. In the present invention, essentially the entire adsorption zone is actively employed by creating an essentially uniform temperature throughout the adsorbent zone. The uniform temperature profile performance of the coated heat exchange surfaces of the present invention was discovered by observing the differences between the inlet and the outlet heat transfer fluid temperatures at the beginning of the desorption step. It was found that the inlet and outlet temperature of the heat transfer fluid flowing through sections of coated tubes became essentially equivalent within 15 to 30 seconds of the introduction of the heat transfer fluid. This indicated that essentially the entire adsorbent coated surface was in active use at the desorption condition for essentially the entire desorption stroke. In contrast, a thermal wave process only employs that portion of the adsorbent at the crest of the thermal wave and the length of the desorption stroke must be sufficient to travel the entire length of the bed. Thus, the present invention achieves a greater cooling power by actively employing a greater mass of adsorbent (that is essentially the entire adsorbent zone) in short cycle times such as about 50 seconds up to about 480 seconds.

In accordance with the present invention, the adsorbents are applied to the inside or outside surfaces of tubes for use in the cooling and heating by adsorption of a refrigerating fluid by the method disclosed in U.S. Pat. No. 5,518,977 hereby incorporated by reference. The preferred tubes are thin-walled and may have a plurality of fins disposed on the outside surface of the tubes. The inside or the outside surface of the tube is coated with a thin layer of solid adsorbent of between about 0.1 and less than 3 mm thickness. Preferably, the layer of solid adsorbent such as zeolite has a uniform thickness of between about 0.1 and about 1.6 mm, and most preferably, the uniform thickness of the solid adsorbent layer is between about 0.4 and 1.2 mm. The coated tube zones or adsorbent sections are typically evacuated to a high vacuum of at least 1 micron of mercury at a temperature of at least 350° C. for a period of at least about 2 to 4 hours; filled with a refrigerant such as water, ammonia, sulfur hexafluoride, light alcohols and mixtures thereof; and sealed in a closed system by providing a closed refrigerant circuit comprising a reservoir, an isolation valve, an evaporator, and a condenser. Preferably, the adsorbent is selected from the group consisting of Y-54, Y-74, Y-84, Y-85, low cerium mixed rare earth exchanged Y-84, calcined rare earth exchanged LZ-210 at a framework $SiO_2/Al_2O_3$ mol equivalent ratio of less than about 7.0 and mixtures thereof.

A suitable working fluid may be selected from materials which remain in the same phase over a range of temperature between the hot source and the cold source temperatures. The working fluid may be a vapor or a liquid or a combination thereof. In the one embodiment of the present invention the working fluid in the vapor phase is employed as the hot working fluid and the working fluid in the liquid phase is employed as the cold working fluid. The working fluid may be selected from the group consisting of water, alcohols, glycols, hydrocarbons, pressurized vapors, flue gases, and mixtures thereof. Hydrocarbon fluids suitable for working fluids include process streams in refinery and petrochemical plants as stabilized product streams from catalytic conversion processes. Preferably, the working fluids comprise overhead vapors from fractionation columns or flue gases which are available at waste heat temperatures above about 80° C. (176° F.). The present invention provides significant economic benefits and operating cost savings in refinery and petrochemical applications including fluid catalytic cracking, crude phenol fractionation, benzene, toluene, xylene, and cumene columns, and naphtha splitters.

DESCRIPTION OF THE DRAWINGS

The process of the present invention is hereinafter described with reference to the drawing which illustrates various aspects of the process. It is to be understood that no limitation to the scope of the claims which follow is intended by the following description. Those skilled in the art will recognize that these process flow diagrams have been simplified by the elimination of many necessary pieces of process equipment including some heat exchangers, process control systems, pumps, fractionation systems, etc. It may also be discerned that the process flow depicted in the figures may be modified in many aspects without departing from the basic overall concepts of the invention.

Figure 1:
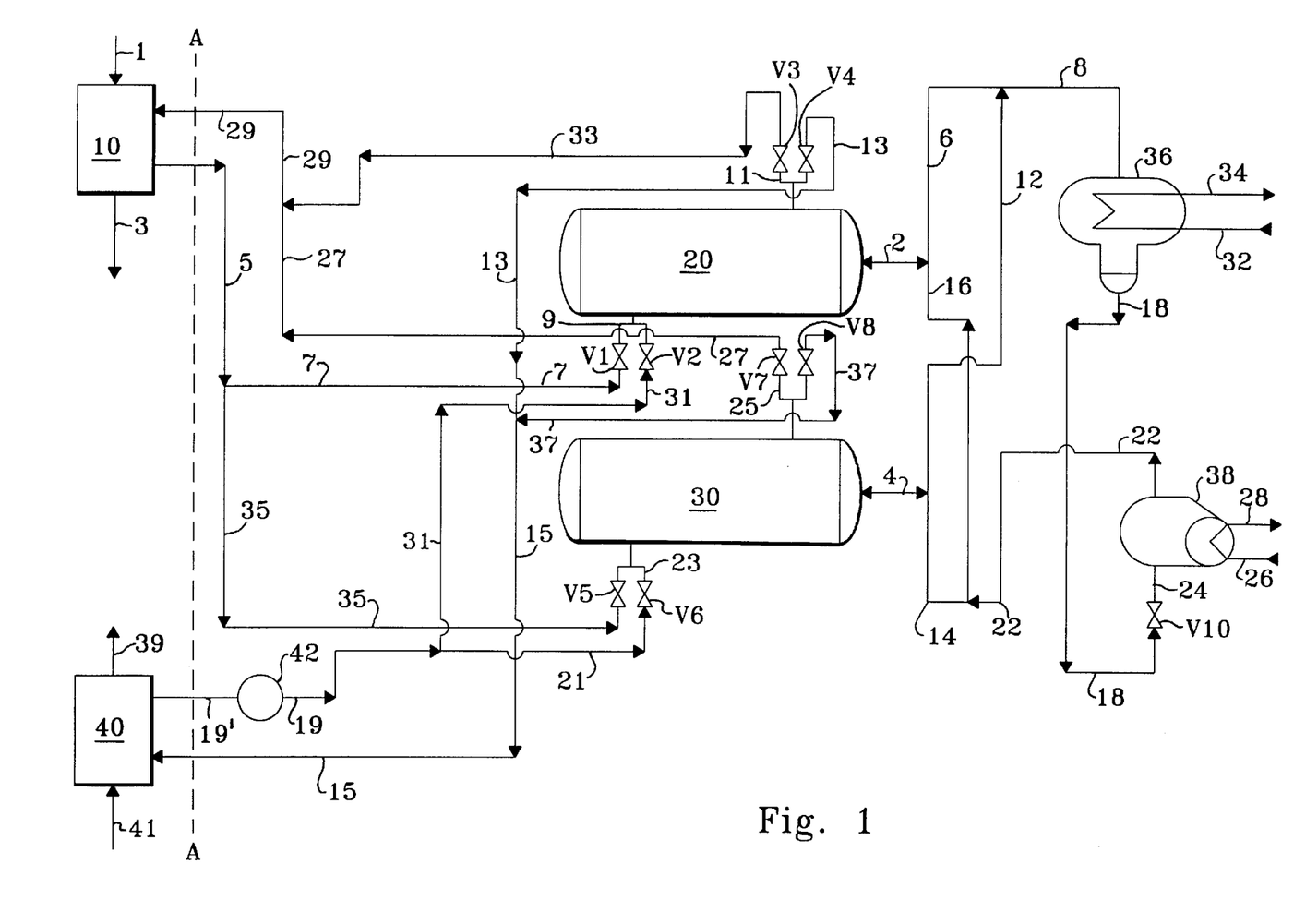
FIG. 1 is a simplified block flow diagram which illustrates the relationship of the sorption cooling system with a working fluid in thermal contact with an external process stream to be cooled.

With reference to FIG. 1, a fluid feedstream 1 is passed to a first heat exchanger 10 wherein the fluid feedstream exchanges heat with a first working fluid stream, or cooled hot exit stream, in line 29 in order to cool the fluid feedstream and produce a cooled fluid stream 3 and a hot working fluid stream 5. The sorption cooling section, comprising sorption zones 20 and 30, and a refrigerant circuit comprising an evaporator 38 and a condenser 36 are shown to the right of section line AA. Generally, the working fluid is any fluid that will remain in the liquid state within the first heat exchanger 10. Preferably, the working fluid is selected from the group consisting of water, a hydrocarbon stream, a glycol, a glycol ether, and mixtures thereof. The hot working fluid stream in line 5 is passed via line 7, valve V1, and manifold 9 to a heat transfer zone within a first sorption zone 20. The first sorption zone 20 comprises the heat transfer zone and an adsorption zone in intimate thermal contact therewith. The adsorption zone can have a configuration such as a fixed bed of adsorbent containing heat exchange surfaces, a shell and tube heat exchanger with adsorbent coating the inside of the tubes, or a shell and tube heat exchanger with adsorbent coating on the outside surfaces of the tubes; the latter being preferred. Flat plate or corrugated plate exchangers with an adsorbent coating on a refrigerant side may also be employed in the process of the present invention. The adsorbent or adsorbent coating comprises a solid adsorbent selected from the group consisting of zeolite molecular sieves, activated carbon, and silica gel. Preferred adsorbents include zeolite A, X, and Y. The adsorbent may also include a clay binder. The introduction of a hot working fluid stream in line 5 to sorption zone 20 establishes sorption zone 20 as a generator by causing refrigerant which was previously adsorbed on the adsorbent to become desorbed in a desorption step or desorption stroke to produce a desorbed vapor stream in line 2. The disposition of the desorbed vapor stream will be further discussed with respect to the refrigerant cycle, hereinbelow. Returning to the heat transfer zone of the first sorption zone 20, the hot working fluid stream in line 5 and line 7 gives up heat to the heat transfer zone, exits the first sorption zone 20 as a hot exit stream via manifold 11 and valve V4, and is returned to the second heat exchanger 40 via lines 13 and 15. In a alternate arrangement, the hot exit stream may be returned to the first heat exchanger 10 via lines 33 and 29 to complete the hot fluid circuit; however, by returning the hot exit stream to the second heat exchanger 40, a single pump may be employed to circulate both the hot working fluid and the cold working fluid when both fluids are the same material in the liquid phase. The temperature of the first sorption zone exit stream is reduced relative to the temperature of the hot working fluid stream in line 5. At the beginning of the desorption step, the temperature of the first sorption zone exit stream is substantially reduced relative to the temperature of the hot working fluid stream and gradually rises as the desorption step proceeds until it is essentially equal to the temperature of the hot working fluid stream at the end of the desorption step. The cold working fluid in line 19 is used to cool the second sorption zone 30 which is undergoing an adsorption step which occurs at the same time as the desorption step in the first sorption zone 20. The cold working fluid is passed via line 19' to a pump 42 and continues via line 21, line 19, valve V6, and manifold 23 to the heat transfer zone of the second sorption zone 30. Therein, the heat transfer zone of the second sorption zone 30 is cooled as a refrigerant vapor stream enters the adsorption zone of the second sorption zone 30 via line 4. The heat generated during the adsorption of the refrigerant vapor heats the heat transfer zone of the second sorption zone 30 to provide a warm exit stream in manifold 25. The warm exit stream is returned to the first heat exchanger 10 via valve V7, line 27 and line 29 to provide the hot working fluid stream in line 5. The second heat exchange is cooled by exchanging heat with a cold stream such as cooling water which enters the second heat exchanger 40 in line 41 and exits via line 39. In an alternate operation, the warm exit stream is returned to the second heat exchanger 40 via valve V8, line 27, and line 15 to provide the cold working fluid stream in line 17. As stated hereinabove, the alternate operation requires a separate hot working fluid pump and the separate cold working fluid pump 42 which the above described scheme requires only a single working fluid pump.

Returning to the refrigerant cycle, the desorbed vapor stream 2 is passed to a condensor 36 via lines 6 and 8. The condenser is cooled with a coolant which is introduced in line 32 and which exits the condenser in line 34. In the condenser, the desorbed vapor stream is at least partially condensed at a condenser pressure to produce a condensate stream. The condensate stream is passed via line 18 to an isolation valve V10 through which the condensate stream irreversibly and adiabatically expands to produce an expanded refrigerant stream in line 24. The isolation valve V10 isolates the pressure of the refrigerant at the condensing pressure of the refrigerant at the evaporator conditions. The expanded refrigerant stream 24 is passed to the expander 38 which is heated with a heating medium stream in line 26. The heating medium exits the evaporator 38 in line 28. The heating medium is generally the stream to be cooled or chilled by the sorption cooling system. The stream to be cooled may be selected from a process stream, a cooling water stream or vapor stream including air. In the evaporator 38, the refrigerant is revaporized to provide the refrigerant vapor steam which is passed via line 22, line 14, and line 4 to the adsorption zone of the second sorption zone 30 to complete the refrigeration cycle.

In the cyclic operation of the sorption cooling system, the sorption zones 20 and 30 alternate operation between an adsorption stroke and a desorption stroke. When the operation is switched such that sorption zone 30 is being desorbed and sorption zone 20 is undergoing adsorption, the desorbed vapor flows from sorption zone 30 in line 4 to condenser 36 via line 12 and line 8, and the refrigerant vapor stream is passed from the evaporator via line 22, line 16, and line 2 to sorption zone 20. During this cyclic operation wherein sorption zone 20 is in the desorption stroke and sorption zone 30 enters the desorption stroke, sorption zone 20 is now cooled by passing the cold working fluid from line 19 through a pump (not shown), line 31, valve V2, and manifold 9 to the heat transfer zone of sorption zone 20. The warm exit stream now in manifold 11 is returned to the hot source, heat exchanger 10, via valve V3, line 33 and line 29. Similarly, sorption zone 20 in the alternate operation is undergoing desorption and is heated by passing the hot working fluid stream 5 to the heat transfer zone of sorption zone 30 via lines 5, 35, valve V5 and manifold 23. In the heat transfer zone of sorption zone 30, the hot working fluid provides heat to desorb refrigerant from the adsorption zone of sorption zone 30 and the hot exit stream is withdrawn from the heat transfer zone of sorption zone 30 in manifold 25 at a hot exit temperature which is a reduced temperature relative to the temperature of the hot source. The hot exit stream is returned to the cold source via valve V8, line 37 and line 15.

Figure 2:
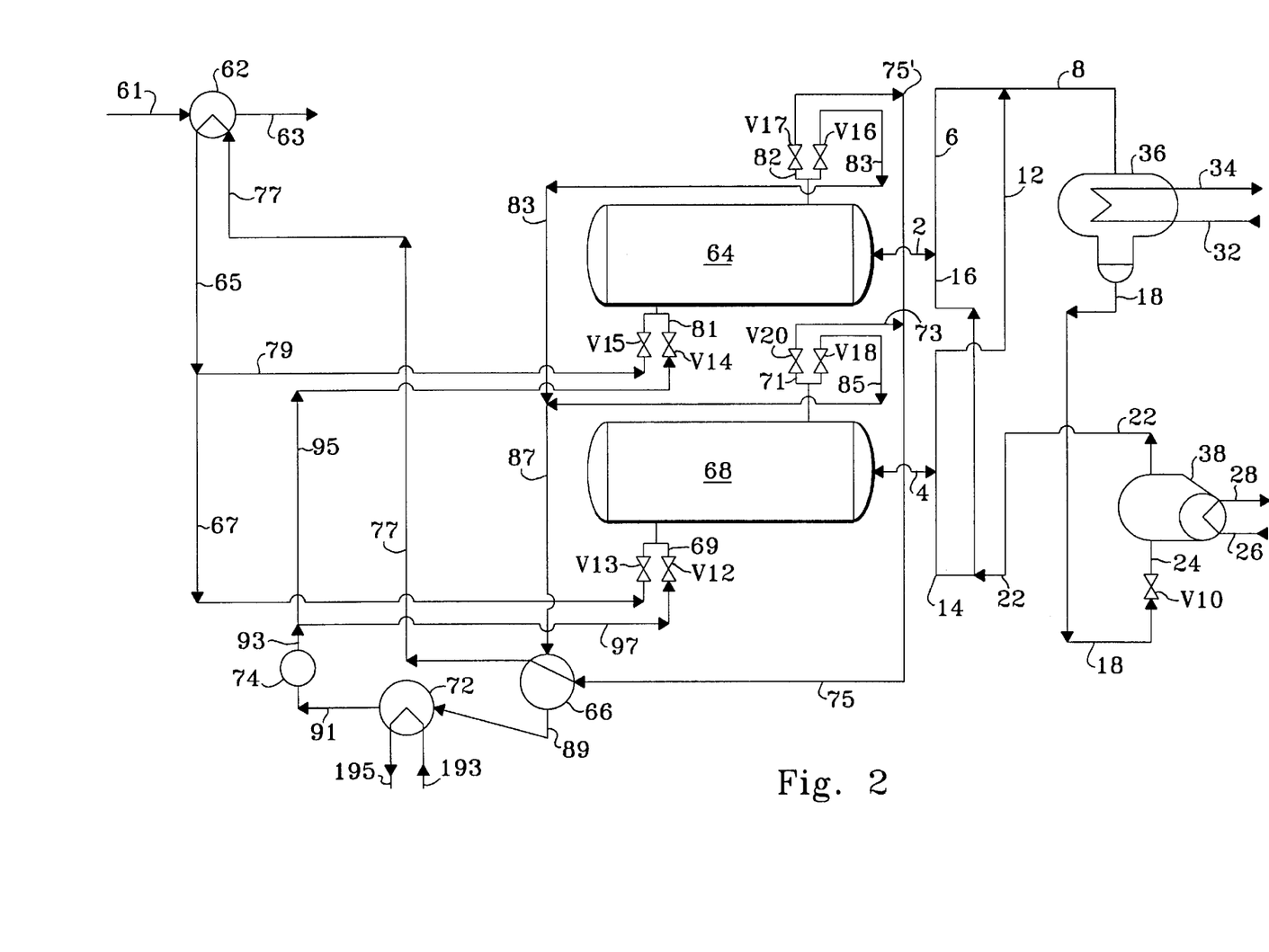
FIG. 2 is a simplified block flow diagram of a sorption cooling system of the present invention comprising an intermediate heat exchanger to moderate swings in working fluid temperatures.

FIG. 2 represents a variation of the integrated sorption cooling scheme presented in FIG. 1 wherein a portion of the heat load on the working fluid side of the process is recovered and the wide fluctuations in the temperatures of the warm and hot exit streams are reduced by cross exchanging the warm exit stream with the hot exit stream. As in FIG. 1, the at least two sorption zones 64 and 68 include a heat transfer zone which is in intimate thermal contact with an adsorption zone. At any point in the cycle, one of the sorption zones is operating as an adsorber receiving refrigerant vapor, and the other is operating as a generator desorbing refrigerant vapor. The operation of the refrigerant cycle is the same as described and illustrated with respect to FIG. 1. The adsorption mode operation is maintained in the sorption zone until a point in the process when the adsorbent in the adsorbent zone has satisfied its adsorption capacity. At that point, the operation of the sorption zones is reversed.

Referring to FIG. 2, a process stream 61 is passed to a first heat exchanger 62, or hot source exchanger, to cool the process stream and produce a cooled process stream in line 63 and by indirect heat exchange with a first working fluid stream in line 77 to produce a hot working stream in line 65. The hot working stream is passed to sorption zone 64, undergoing desorption via line 65, line 79, valve V15 and manifold 81. The resulting hot exit stream at a hot exit temperature is withdrawn from the heat exchange zone of sorption zone 64 at manifold 82. The hot exit stream is passed via valve V16, line 83, and line 87 to a first side of an intermediate heat exchanger 66 wherein the hot exit stream in line 87 is heat exchanged by indirect heat exchange with a warm exit stream in line 75 on a second side of the intermediate heat exchanger 66 to provide a first heated warm stream in line 77 from the second side and a first cooled hot stream in line 89 from the first side. The first heated warm stream in line 77 is returned to the hot source exchanger 62 to be reheated to the hot source temperature via line 89 to the hot source exchanger 62. The first cooled hot stream in line 89 is returned to the cold source exchanger 72, or a second heat exchange for cooling to the cold source temperature via line 89 to the cold source heat exchanger 72 wherein the first cooled hot stream in line 89 is cooled by indirect heat exchange with a cooling medium stream which enters in line 193 and exits the cold side of the cold source exchanger 72 in line 195 to provide the cold working fluid stream in line 91. The cooling medium may be cooling water, air, or some other process stream. The cold working fluid stream in line 91 is passed through pump 74, line 93, line 97, and valve V12, and manifold 69 to the heat transfer zone of sorption zone 68 operating in an adsorption mode. A warm exit stream is withdrawn via manifold 71 and passed to the second side of the intermediate heat exchanger 66 via valve V20 and line 75.

At the beginning of a cycle, which consists of both a desorption stroke and an adsorption stroke, the sorption zone 64 which is undergoing desorption is heated to desorb previously adsorbed refrigerant. As the refrigerant is being desorbed, the exit temperature of the hot exit stream in line 83 is lower than the hot source temperature, and having just completed an adsorption step, the exit temperature of hot exit stream is essentially equal to the cold source temperature. As the desorption proceeds, the exit temperature of the hot exit stream increases to a point such that at the completion of the desorption step, the exit temperature of the hot exit stream is essentially equal to the hot source temperature. According to the present invention, when the hot exit stream is near its lowest point, it is heat exchanged with the warm exit steam from a sorption zone undergoing adsorption. The warm exit stream experiences a similar, but opposite temperature history through the course of a cycle. In its simplest form, the present invention minimizes these temperature variations and the impact of these variations on the operation of the hot source exchanger 62 and the cold source exchanger 72 wherein a more stabilized operation is desired. A temperature by-pass controller (not shown on FIG. 2) may be provided to permit the by-passing of either a portion of the hot exit stream from line 75 to line 77 or a portion of the warm exit stream from line 87 to line 89 around the intermediate exchanger 66 in order to moderate fluctuations in the hot exit stream or the warm exit stream temperature to provide a further stabilized operation.

When the adsorption capacity is reached, the sorption zone operations are reversed and sorption zone 64 is operated as an adsorber and sorption zone 68 is operated in desorption mode as a generator. In this reverse operation, or the other half of a complete sorption cooling cycle, the hot working stream is passed to sorption zone 68 via line 65, line 67, valve V13 and manifold 69 while the cold working fluid stream in line 91 is passed through pump 74, line 93, line 95, valve V14, and manifold 81 to sorption zone 64. The warm exit stream in manifold 82 is withdrawn from sorption zone 64 and returned to the hot source exchanger 62 via manifold 82, valve V17, line 75', line 75, the intermediate heat exchanger 66, and line 77. The hot exit stream in manifold 71 is withdrawn from sorption zone 68 and passed via valve V18, line 85, and line 87 to intermediate heat exchanger 66.

Figure 3:
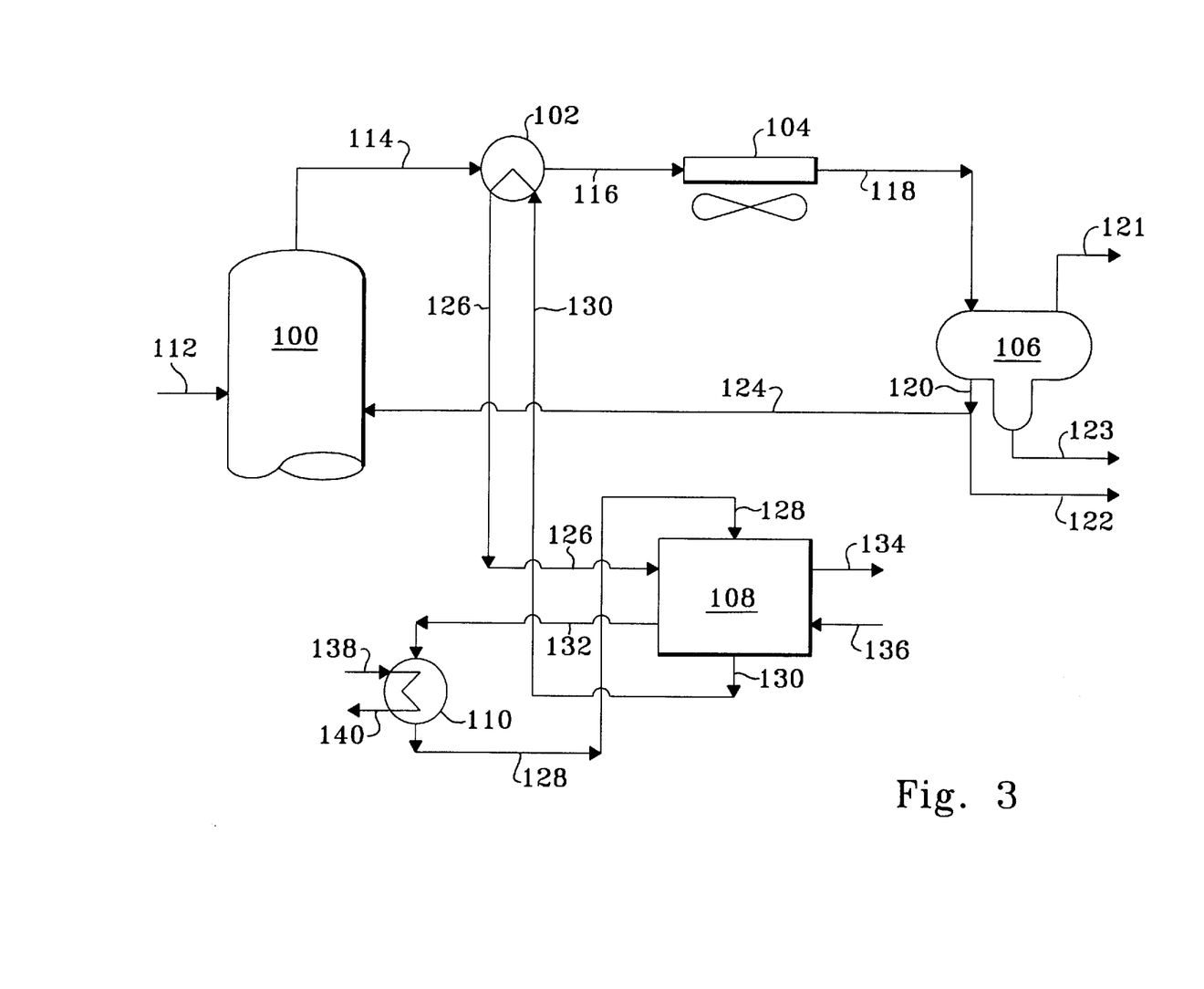
FIG. 3 is a simplified block flow diagram of the present invention for the integration of a sorption cooling section producing a chilled stream with a fractionation zone producing a condensable stream where a hot source exchanger provides cooling for the condensable stream.

FIG. 3 represents an integration of the sorption cooling section as shown in FIG. 1 to the right of section line AA within a hydrocarbon processing operation such as fractionation. Although the following discussion is presented with reference to a main fractionator for a fluid catalytic cracking process, the concept may be viewed more generally to substitution for compressor driven refrigeration chiller application in the recovery of light hydrocarbons and in fractionation column overhead heat recovery schemes in petroleum refining and in processes for the production of petrochemicals. Petroleum refining applications include product fractionation in crude distillation, hydrocracking and lube oil production. Petrochemical processes include the production of cumene, ethylbenzene, and aromatic derivatives such as phenol and, more specifically, the steam-stripping and rectification of phenol to produce a high purity product.

Referring to FIG. 3, a feedstream in line 112 is passed to fractionation zone 100 and an overhead stream is withdrawn from the fractionation zone in line 114 and passed to a first heat exchanger 102 or hot source exchanger to cool the overhead stream by indirect heat exchange with a cooled hot exit stream in line 130 to provide a cooled overhead stream in line 116 and a hot working fluid stream in line 126. The cooled overhead stream is passed via line 116 to an air cooler 104 to further cool and at least partially condense the cooled overhead stream to provide a condensed overhead stream in line 118. The condensed overhead stream in line 118 is optionally passed through an overhead trim cooler (not shown) to provide a cooled condensed overhead stream. The condensed overhead stream in line 118 is passed to an accumulator or overhead receiver 108 wherein the overhead stream is separated to provide a vapor stream in line 121, an aqueous stream 123, and a hydrocarbon condensate stream 120.

The vapor stream in line 121 is directed to further hydrocarbon recovery (not shown) and the aqueous stream in line 123 comprising impurities such as hydrogen sulfide and ammonia is passed to sour water treatment (not shown). A portion of the hydrocarbon condensate stream in line 120 comprising unstabilized gasoline boiling range hydrocarbons such as $C_4$–$C_{10}$ hydrocarbons is recycled to fractionation zone 100 as reflux for the main column in line 124 while the remaining portion of the hydrocarbon condensate stream in line 122 is sent to further treatment and recovery (not shown) to produce a high octane gasoline blending component.

The hot working fluid stream in line 126 is passed to a sorption cooling section 108 (shown to the right of Section Line AA in FIG. 1) which operates as described hereinabove with reference to FIG. 1. A cold working fluid stream in line 128 is passed to the sorption cooling section 108 to chill a cooling water stream in line 136 and to provide a chilled water stream which is withdrawn in line 134. A hot exit stream in line 132 is withdrawn from the sorption cooling section 108 and is passed to heat exchanger 110, or the cold source exchanger, to provide the cold working fluid stream in line 128 by indirect heat exchange with a cooling water stream in line 138 and withdrawn in line 140. A heated warm exit stream in line 130 is withdrawn from the sorption cooling section 108 and passed to the hot source heat exchanger 102. During the operation of the process of the current invention, the sorption cooling section 108 is cycled between adsorption and desorption to provide a continuous flow of the streams entering and leaving the sorption cooling section 108.

Figure 4:
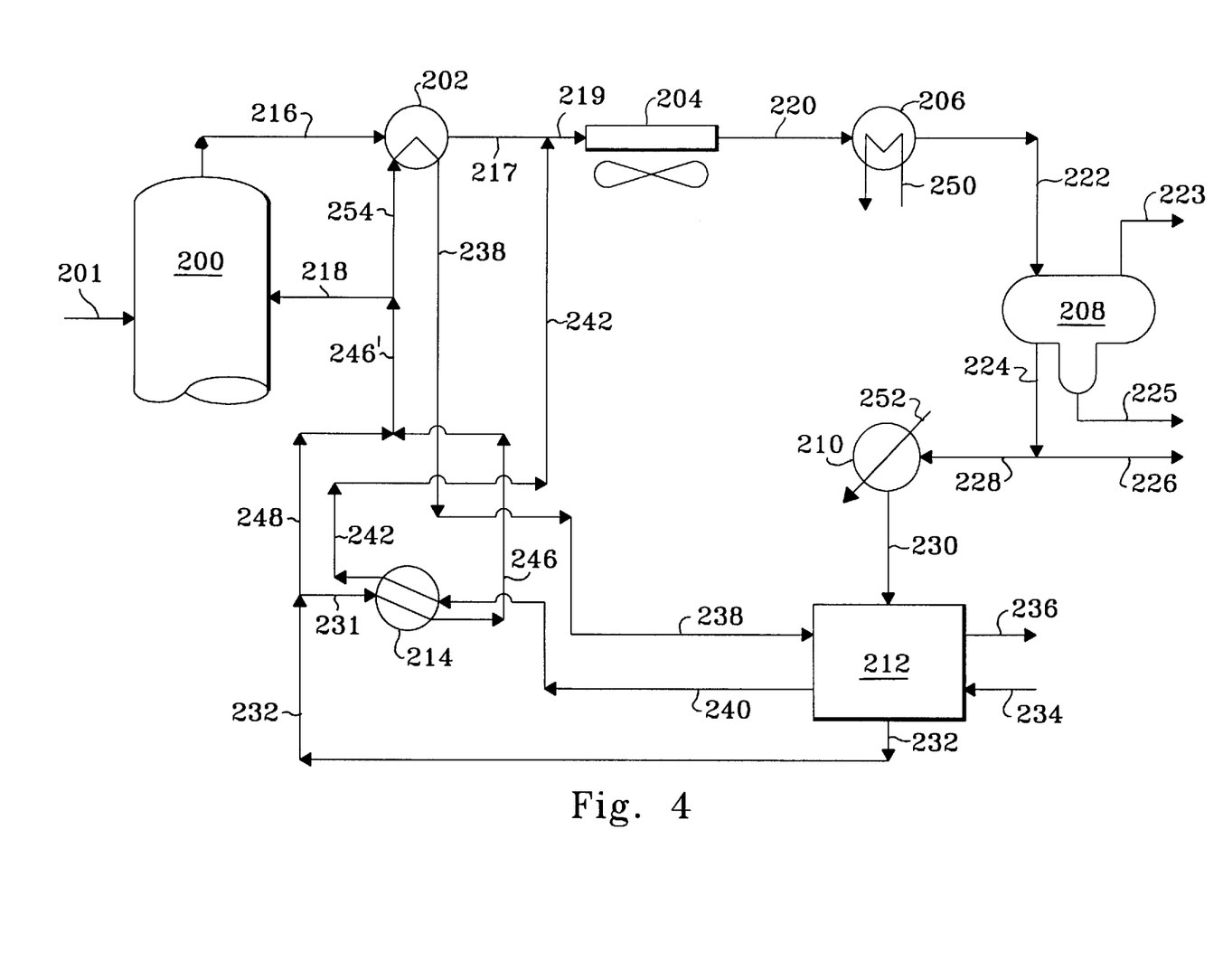
FIG. 4 is a simplified block flow diagram of the process of the present invention wherein the cold working fluid is a portion of the condensed liquid product and a first portion of the cooled hot exit stream is used to provide reflux to the fractionation zone and a second portion of the cooled hot exit stream is exchanged with the condensable stream to provide the hot working fluid stream.

One method for integrating sorption cooling into a process scheme such as a Fluid Catalytic Cracking (FCC) process is by employing a process stream as the hot or the cold source stream. In FIG. 4, the hydrocarbon condensate is employed as the cold source stream. Referring to FIG. 4, a feedstream is passed to fractionation zone 200 and an overhead stream in line 216 is withdrawn. The overhead stream in line 216 is passed to a first heat exchanger, or hot source exchanger 202 to cool the overhead stream by indirect heat exchange to provide a cooled overhead stream in line 217 and to heat a heated warm exit stream in line 254 to provide a hot working fluid stream in line 238. The hot working fluid stream in line 238 is passed to a sorption cooling section 212 (as described hereinabove in FIG. 1 to the right of Section Line AA) to chill a water stream in line 234 and produce a chilled water stream in line 236 by the cyclic operation of the sorption cooling section 212. A hot exit stream in line 240 is withdrawn from the sorption cooling section, and a cold working fluid in line 230 is passed to sorption cooling section 212 and a warm exit stream is withdrawn in line 232. The hot exit stream in line 240 is passed to an intermediate exchanger 214 to provide a cooled hot exit stream in line 242 and by indirect heat exchange with at least a portion of the warm exit stream in line 232 to provide a heated warm exit stream in line 246 and 246'. At least a portion of the heated warm exit stream in lines 246' and 254 is passed to the hot source exchanger 202 wherein the portion of the heated warm exit stream in line 254 is heated to provide the hot working fluid stream in line 238 while a portion of the warm exit stream is returned to the fractionation zone 200 as a reflux stream in line 218. Because it is important for continuous operation of the FCC process to maintain the temperature and flow rate of the reflux stream in line 218 and the cooled overhead stream in line 217 at an essentially constant level, a portion of the warm exit stream in line 232 may be admixed with the heated warm exit stream in line 246 via line 248. The cooled overhead stream in line 217 is admixed with the cooled hot exit stream in line 242 to produce a combined overhead stream in line 219. The combined overhead stream in line 219 is passed to condenser 204 to at least partially condense the combined overhead stream in line 219 and produce a condenser effluent stream in line 220. The condenser effluent stream is cooled in a condenser trim cooler 206 to provide a cooled condenser effluent stream in line 222. The cooled condenser effluent stream is passed to accumulator 208 to separate the cooled condenser effluent stream in line 222 into a vapor stream in line 223, an aqueous stream 225, and a condensate stream in line 224. A portion of the condensate stream is recovered as a high octane blending component for producing motor fuel in line 226, although some further processing may be required to control vapor pressure by removal of some low boiling hydrocarbons such as butane and lighter. The remaining portion of the condensate in line 228 may be used as the cold working fluid stream in line 230 or it may be cooled in optional cooler 210 to provide the cold working fluid stream in line 230. The optional cooler 210 may be further cooled with water or with other process streams in line 252. Similarly, the trim cooler 206 may be cooled with a cooling water stream in line 250.

Figure 5:
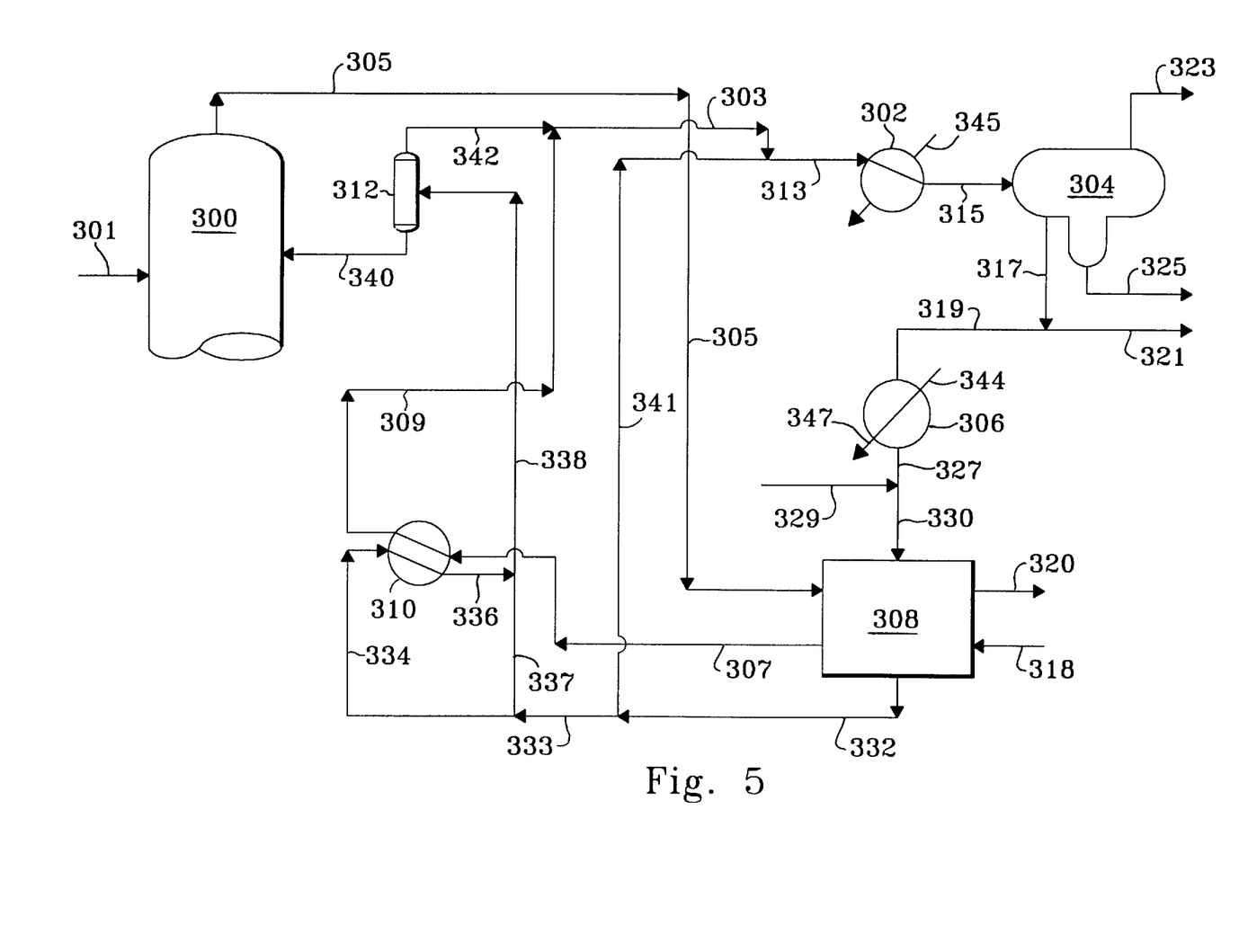
FIG. 5 is a simplified block flow diagram of the present invention wherein the condensable stream is used directly as the hot working fluid stream and a liquid portion of the condensable stream is used as the cold working fluid in a sorption cooling section to produce a chilled stream.

Another method whereby a sorption cooling section may be integrated with a hydrocarbon or petrochemical process is by employing an overhead stream from a fractionation zone as the hot working fluid stream and a condensed portion of the overhead stream as the cold working fluid stream wherein the overhead stream will be at least partially condensed to produce a condensed liquid stream. Referring to FIG. 5, a feedstream in line 301 is introduced to fractionation zone 300 and an overhead stream in line 303 is withdrawn. The overhead stream in line 303 is passed via line 305 to the sorption cooling section 308 and a hot exit stream is withdrawn in line 307. The sorption cooling section chills cooling stream 318 to produce chilled stream 320 for use elsewhere in the hydrocarbon or petrochemical process. A cold working fluid stream in line 330 is passed to the sorption cooling section 308 and a warm exit stream in line 332 is withdrawn. The hot exit stream in line 307 is passed to an intermediate exchanger 310 to cool the hot exit stream and to produce a cooled hot exit stream in line 309. In the intermediate exchanger 310, the hot exit stream in line 307 is heat exchanged by indirect heat exchange with at least a portion of the warm exit stream in line 332 via lines 333 and 334 producing a heated warm exit stream in line 336. The cooled hot exit stream in line 309 is passed via line 303 and line 313 to condenser 302 which is cooled with a second cooling stream 345 to produce a condensed overhead stream in line 315. The condensed overhead stream in line 315 is passed to accumulator 304 from which a non-condensable vapor stream is withdrawn in line 323, and an aqueous portion is withdrawn in line 325. The non-condensable vapor stream in line 323 is passed to further treating (not shown) or used as a fuel, and the aqueous portion is passed to a sour water treating zone (not shown) for proper disposal. The condensed hydrocarbon portion of the overhead stream is withdrawn from accumulator 304 in line 317 as a condensed liquid stream. A portion of the condensed liquid stream in line 317 is withdrawn as a hydrocarbon product stream in line 321. Another portion or remaining portion of the condensed liquid stream in line 317 is passed via line 319 to optional cooler 306 to provide the cold working fluid in lines 327 and 330. The optional cooler 306 is cooled by indirect heat exchange with a first cooling stream 344, and a first exit stream is withdrawn in line 347 from optional cooler 306. In an alternate operation (not shown in FIG. 5), a portion of the first exit stream in line 347 may be employed as the second cooling stream in line 345. Returning to the intermediate exchanger 310, the heated warm exit stream in line 336 is admixed with a portion of the warm exit stream in line 332 via lines 333 and 337 to control the reflux temperature of the admixed warm exit stream in line 338. Line 338, which may now be partially vaporized, is passed to flash zone 312 to provide a flashed vapor stream in line 342 and a flashed liquid stream in line 340. The flashed liquid stream in line 340 is returned to the fractionation zone 300 as the reflux stream in line 340, and the flashed vapor stream in line 342 is admixed with the cooled hot exit stream in line 309 to produce an overhead admixture stream in line 303, which is subsequently passed to condenser 302 via line 313 as the hot working fluid stream. The excess portion of the warm exit stream in line 332 which is not required as reflux in the fractionation zone 300, is admixed with the overhead stream in line 303 and passed to condenser 302 via line 313.

Figure 6:
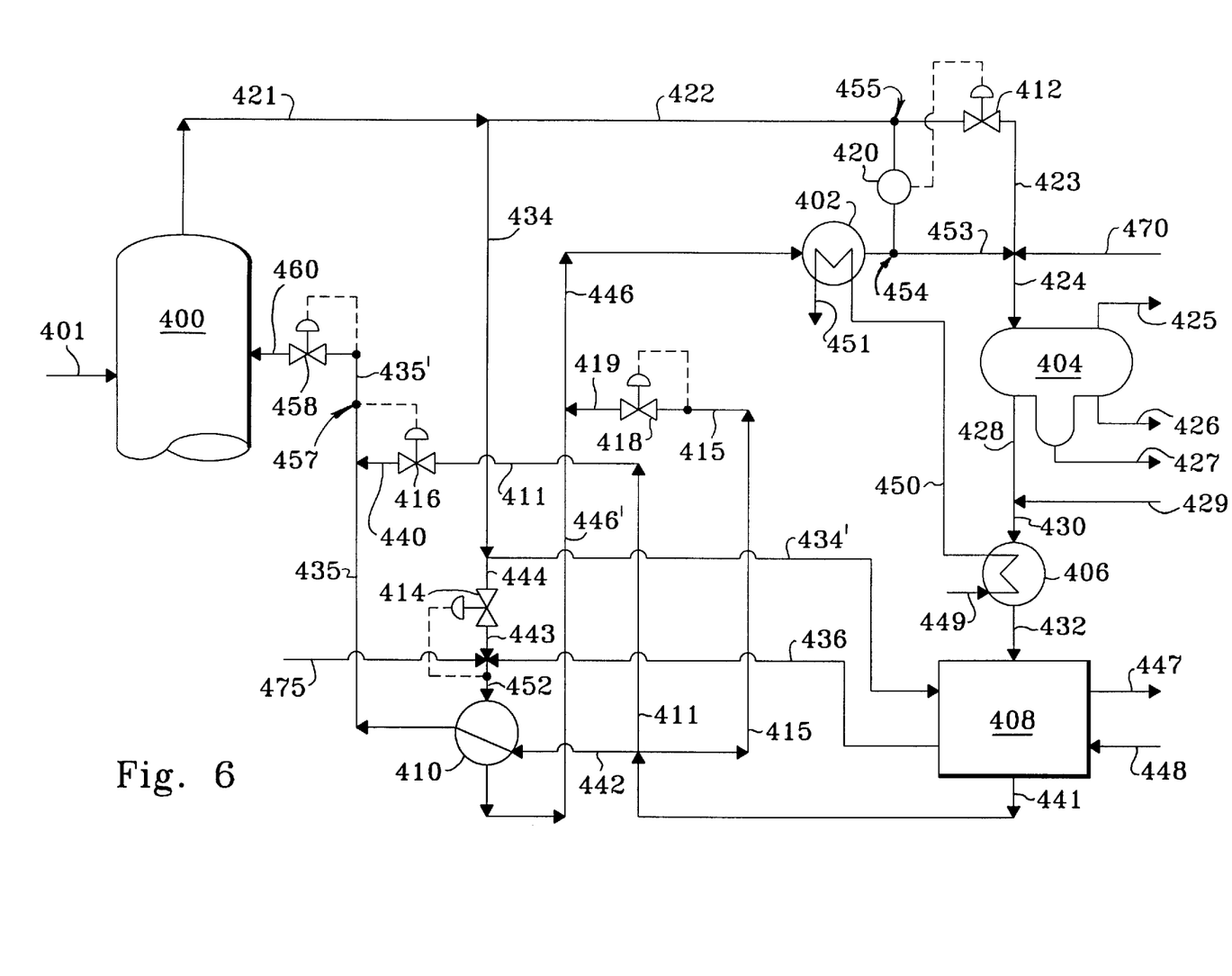
FIG. 6 is a simplified flow diagram of the present invention illustrating a control system for minimizing the potential for pressure collapse in the integrated process wherein the hot working fluid stream is maintained in the vapor phase.

Working with fractionation zones which require relatively constant reflux flow rates and temperatures to maintain relatively continuous product yields and product compositions also presents a further problem of handling overhead streams during heat transfer operations for particular mixtures of components which may suddenly cause the stream to essentially totally condense and result in a process upset from a pressure collapse. FIG. 6 represents a control scheme to prevent such a pressure collapse. Referring to FIG. 6, a feedstream in line 401 is passed to fractionation zone 400 and a condensable overhead stream is withdrawn in line 421.

The condensable overhead vapor stream, which comprises components which are essentially totally condensable as a hot fluid stream, is passed to a sorption cooling section 408 via lines 421, 434, and 434'. The hot fluid stream in line 434' is used to desorb refrigerant in a first sorption zone within the sorption cooling section 408 and following heat exchange with the adsorbent in the first sorption zone, a hot exit stream is withdrawn in line 436. The hot exit stream in line 436 is passed to an intermediate heat exchanger 410 via lines 436 and 452. A cold working fluid in line 432 is passed to the sorption cooling section 408 to facilitate adsorption in a second sorption zone (See FIG. 1) in the sorption cooling section 408 and a warm exit stream is withdrawn in line 441 following heat exchange with the adsorbent in the second sorption zone (detail not shown in FIG. 6). In the sorption cooling zone 408, a cooling water supply stream in line 447 is chilled to produce a chilled water stream in line 448. The hot exit stream in line 452 is heat exchanged by indirect heat exchange in intermediate exchanger 410 with the warm exit stream in line 442 to produce a cooled hot exit stream in line 446, and a heated warm exit stream in line 435. The cooled hot exit stream in line 446 is passed to overhead condenser 402 via line 446 to cool and at least partially condense the cooled hot exit stream in line 446 and to provide an at least partially condensed stream in line 453. The at least partially condensed stream is passed to the accumulator 404 via lines 453 and 424. If the difference in pressure between the top of the fractionation zone 400 as indicated at point 455 and the pressure of accumulator 404 as indicated at a point 454 between the condenser and the accumulator is too high, indicating an over cooling situation and a collapse of the pressure in the accumulator, valve 412 is opened to permit hot vapors to flow directly to the accumulator 404 from the fractionation zone 400, as a hot vapor by-pass operation via lines 421, 422, 423, and 424 to re-establish desired pressure conditions in the accumulator 404. The over cooling problem can result from a process upset or a change in weather conditions. The opening of valve 412 is adjusted periodically to maintain a constant desired pressure differential. By maintaining the desired pressure differential between the fractionation zone 400 and the accumulator 404, operating problems such as equipment damage, vibration, and yield loss due to pressure collapse can be minimized. The introduction of a controlled amount of an external non-condensable inert gas such as nitrogen to the accumulator 404 via line 470 can provide a viable alternative in the pressure control of the process, but the hot vapor by-pass operation described herein above is the preferred operation in that it does not involve the additional consumption of the external stream, which results in a higher operating cost. In accumulator 404, the overhead stream in line 424 is separated into a vapor stream which is withdrawn in line 425, and aqueous stream which is withdrawn in line 427, and a hydrocarbon stream. A portion of the hydrocarbon stream is withdrawn via line 426 as a hydrocarbon product stream, and another portion of the hydrocarbon stream in line 428 as a condenser effluent stream which is withdrawn for use as the cold working fluid in line 432. A cold water stream 429 may be injected into the hydrocarbon stream in line 428 to provide additional cooling for the sorption cooling section to provide the condenser effluent stream in line 430. Optionally, the condenser effluent stream in line 428 may be further cooled in optional cooler 406. The optional cooler is operated by cooling the condenser effluent stream 430 by exchange with a cooling water stream 449 and a cooling water outlet stream in line 450, withdrawn from the optional cooler 406 is used to cool the condenser 402 by cross-exchange. A spent cooling water is withdrawn from condenser 402 in line 451.

Control valve 414 stabilizes the pressure within the sorption cooling section 408 by measuring a hot exit zone pressure of the hot exit stream at the outlet of the sorption cooling section and permitting a portion of the condensable overhead vapor stream to by-pass the sorption cooling section 408 to maintain a hot exit pressure of the sorption cooling section 408. The by-passed portion of the condensable overhead vapor stream in line 444 is admixed with the hot exit stream 436 via lines 421, 434, and 444 and valve 414 to provide a hot exit return stream in line 452. As an alternative pressure control scheme, a controlled amount of a non-condensable stream selected from the group consisting of nitrogen, argon, methane, ethane, carbon dioxide, hydrogen and mixtures thereof may be introduced to the hot exit stream via line 475 to maintain a stable hot exit pressure and prevent pressure collapse.

At least a portion of the warm exit stream in line 441 in normal operation is passed to the intermediate exchanger 410 via line 442 to indirectly exchange heat with the hot exit stream in line 452 and produce a heated warm exit stream in line 435. A portion of the warm exit stream in line 441 is by-passed around the intermediate heat exchanger 410 to maintain a reflux temperature by control of the portion of the warm exit stream admixed with the heated warm exit stream in line 435, via line 411, valve 416, and line 440. The reflux temperature is measured at a point 457 in line 435' between an admixing point of line 435 and 440 and the fractionation zone 400; and as required, a portion of the warm exit stream in line 441 is admixed with the cooled hot exit stream in line 435 by opening valve 416 to permit the flow of the portion of the warm exit stream in line 440 via lines 441 and 411, valve 416 and line 440. The admixture of the warm exit stream in line 435' is returned to the fractionation zone 400 as a reflux stream via line 435', valve 458 and line 460. Valve 458 is a control valve which measures and controls the flow of material in line 435' and opens to maintain the reflux flow rate at an essentially continuous value as required to maintain a stable operation in the fractionation zone 400. The excess portion of the warm exit stream in line 441 is admixed with the cooled hot exit stream in line 446' via lines 441, 415, valve 418, line 419, and passed to condenser 402 via line 446.

Multi-port valves may be employed in the sorption cooling sections of the present invention to direct the flow of hot and cold working fluids entering and leaving the heat transfer zones of the sorption cooling section. Preferred multi-port valves include a 3-way valve to minimize piping requirements and simplify overall control of the process.

EXAMPLES

Example I

A sorption cooling section as shown in FIG. 2 is employed to reduce the temperature of an overhead stream comprising $C_1$–$C_{10}$ hydrocarbon water and impurities such as $H_2S$ and ammonia from a fractionator. By cross-exchanging the overhead stream at a hot process temperature of 121° C. (250° F.) with a cooled hot exit stream at a hot intermediate temperature of about 88° C. (190° F.) from the sorption cooling section, the temperature of the overhead stream is reduced about 6.7° C. (12° F.) to about 114° C. (238° F.), and produces a hot working fluid at a hot source temperature of about 110° C. (230° F.). Following intermediate heat exchange between the hot exit stream and the warm exit stream, the heated warm exit stream has a warm intermediate temperature of about 57° C. (135° F.). In the refrigerant circuit wherein the adsorbent is a zeolite and the refrigerant is water, the desorbed vapor leaves a first adsorption zone within the sorption section at a temperature of about 107° C. (225° F.) and is passed to a condenser which at least partially condenses the desorbed vapor to produce a refrigerant condensate at a temperature of about 46° C. (115° F.). The refrigerant condensate is passed through a separation valve and passed to an evaporator. The evaporator revaporizes the refrigerant by producing chilled water having a chilled stream temperature of about 15° C. (60° F.) and a revaporized refrigerant is withdrawn at a temperature of about 10° C. (50° F.). The revaporized refrigerant is passed to another adsorption zone in the sorption cooling section which is being cooled with the cold working fluid at a cold source temperature of about 35° C. (95° F.). In this manner the sorption cooling section provides about 0.3 MW (10.35 MM BTU/HR) in producing chilled water at 15° C. by recovering waste heat from the fractionator overhead stream.

Example II

A conventional mechanical chiller to provide the same chiller duty (0.3 MW) of Example I is compared to the operation of a two sorption zone, sorption cooling section as described hereinabove. The sorption cooling section employs finned tubes coated with a thin layer of adsorbent and contained within a shell with a refrigerant space or adsorption zone or the outside of the tubes and a heat exchange zone on the inside of the tubes. The refrigerant is water vapor and the refrigerant is a Y zeolite molecular sieve. The economic advantage of the sorption cooling section over the conventional chiller is illustrated in Table 1. The installed equipment cost for the additional heat exchangers as shown in FIG. 4 which includes heat exchangers 202, 206, 214, and 210 and the sorption cooling section is approximately 2.1 million dollars, and the installed cost for a package chiller with the same capacity is about 1 million dollars. At an electricity cost of $0.05 per kilowatt hour (Kwh), the annual energy cost savings of the sorption cooling section over the conventional chiller is about 0.4 million dollars per year. At this rate of utility savings, the difference in investment between the sorption cooling section and the conventional chiller will be returned in about 3 years of operation, or return about 36 percent on the incremental investment, a clear economic advantage over the conventional chiller.

TABLE 1

RECOVERY OF FCC MAIN COLUMN OVERHEAD WASTE HEAT

|  | SORPTION COOLING SECTION | CONVENTIONAL CHILER |
|---|---|---|
| INSTALLED EQUIPMENT COST, $MM | 2.1 | 1.0 |
| ANNUAL UTILITY COST, $MM @ $0.05/Kwh | 0.1 | 0.5 |
| ANNUAL ENERGY SAVINGS, $MM | 0.4 |  |
| RETURN ON INCREMENTAL INVESTMENT $ | 36 |  |

We claim:

1. A process for continuous cooling of a condensable process stream with a sorption cooling system for producing a separate chilled stream, said process comprising:

a) passing the condensable process stream to a hot source exchanger and therein cooling the condensable process stream by indirect heat exchange with a cooled hot exit stream to provide a cooled condensable process stream and a hot working fluid stream;

b) passing the hot working fluid stream and a cold working fluid stream to the sorption cooling system and withdrawing a hot exit stream and a warm exit stream; and c) heat exchanging by indirect heat exchange the hot exit stream with at least a portion of the warm exit stream in an intermediate heat exchanger to provide the cooled hot exit stream and a heated warm exit stream and cooling the heated warm exit stream to provide the cold working fluid stream.

2. The process of claim 1 wherein the sorption cooling system comprises:

a) at least two sorption zones, each sorption zone having a heat exchange zone and an adsorption zone containing a solid adsorbent, said heat exchange zone being in intimate thermal contact with said adsorption zone, each adsorption zone being in fluid communication with a condenser and an evaporator in a sorption refrigeration circuit so that desorbed refrigerant vapor can flow from the adsorption zone being heated into the condenser and a vaporized refrigerant from the evaporator can flow into the adsorption zone being cooled; and b) alternating the heating and cooling of a first sorption zone and a second sorption zone with the hot working fluid stream and the cold working fluid stream to provide continuous sorption cooling of the separate chilled stream.

3. The process of claim 1 wherein the condensable process stream comprises an overhead stream from a fractionation zone.

4. The process of claim 1 wherein the hot working fluid stream is selected from the group consisting of water, hydrocarbons, glycols, flue gases, pressurized vapors, and mixtures thereof.

5. The process of claim 1 wherein the cold working fluid stream is selected from the group consisting of water, hydrocarbons, glycols, pressurized vapors, flue gases, and mixtures thereof.

6. The process of claim 1 further comprising at least partially condensing the cooled condensable process stream and recovering a liquid condensate.

7. The process of claim 6 further comprising using at least a portion of the liquid condensate as the cold working fluid stream.

8. The process of claim 1, wherein said hot working fluid stream and said cold working fluid stream comprise liquids.

9. The process of claim 1 wherein the hot working fluid stream comprises a vapor and the cold working fluid stream comprises a liquid.

10. The process of claim 1 wherein the condensable process stream comprises a main fractionator overhead stream in a fluid catalytic cracking process.

11. A process for producing a chilled water stream from a continuous sorption cooling section of a fluid catalytic cracking (FCC) unit, said process comprising:

a) passing a cold working fluid stream, a hot working fluid stream, and a cooling water stream to said sorption cooling section and withdrawing a hot exit stream, a warm exit stream, and the chilled water stream;

b) heat exchanging the hot exit stream by indirect heat exchange with the warm exit stream in an intermediate exchanger to provide a cooled hot exit stream and a heated warm exit stream;

c) fractionating an FCC reactor effluent stream in a fractionation zone and withdrawing an overhead stream, cooling the overhead stream by indirect heat exchange with a portion of the heated warm exit stream to provide the hot working fluid stream and a cooled overhead stream, returning at least a portion of the heated warm exit stream to the fractionation zone as a reflux stream, and admixing the cooled hot exit stream with the cooled overhead stream; and, d) recovering a liquid condensate from the cooled overhead stream and returning at least a portion of the liquid condensate stream to said sorption cooling section as the cold working fluid stream.

12. The process of claim 11 further comprising admixing a portion of the warm exit stream with the heated warm exit stream.

13. The process of claim 11 further comprising further cooling and condensing the cooled overhead stream to at least partially condense the cooled overhead stream to produce a partially condensed stream.

14. The process of the claim 13 further comprising further cooling the portion of the liquid condensate stream prior to returning said portion to said sorption cooling section as the cold working fluid stream.

15. A process for integrating the production of a chilled water stream from a continuous sorption cooling section of a fluid catalytic cracking (FCC) unit, said process comprising:

a) fractionating an FCC reactor effluent stream in a fractionation zone and withdrawing a condensable overhead stream comprising $C_1$–$C_8$ hydrocarbons and passing said overhead stream to said sorption cooling section as the hot working fluid stream to desorb an adsorption zone within said sorption cooling section and withdrawing a hot exit stream;

b) heat exchanging the hot exit stream by indirect heat exchange with a warm exit stream withdrawn from said sorption cooling section to provide a cooled hot exit stream and a heated warm exit stream;

c) further cooling the cooled hot exit stream to provide a partially condensed stream, passing the partially condensed stream to an accumulator and withdrawing from the accumulator a liquid hydrocarbon stream;

d) withdrawing at least a portion of the liquid hydrocarbon stream as a liquid product stream and returning at least a portion of the liquid hydrocarbon stream to said sorption cooling section as a cold working fluid stream to cool another adsorption zone within said sorption cooling section and withdrawing the warm exit stream; and e) passing at least a portion of the heated warm exit stream to the fractionation zone as a reflux stream.

16. The process of claim 15 further comprising flashing at least a portion of the heated warm exit stream to produce a vaporized warm exit stream and a liquefied warm exit stream and admixing the vaporized warm exit stream with condensable cooled hot exit stream and passing the liquefied warm exit stream with the reflux stream.

17. The process of claim 15 further comprising admixing a portion of the warm exit stream with the heated warm exit stream.

18. The process of claim 15 further comprising admixing a water wash stream with the cold working fluid stream and withdrawing an aqueous stream from said accumulator.

19. A control system for integrating a continuous sorption cooling section with a fractionator producing a condensable overhead stream wherein said condensable overhead stream is essentially totally condensable, said control system comprising:

a) passing a portion of the overhead stream at an overhead pressure to the sorption cooling section to desorb an adsorption zone therein and withdrawing a hot exit stream;

b) heat exchanging the hot exit stream by indirect heat exchange with a warm exit stream withdrawn from another adsorption zone at a warm exit zone pressure of said sorption cooling section to provide a cooled hot exit stream and a heated warm exit stream, and returning the heated warm exit stream to the fractionation zone as a reflux stream at a reflux pressure;

c) further cooling the cooled hot exit stream in a condenser to provide a partially condensed stream at a condenser pressure and separating a liquid stream from said condensed stream; and, d) determining a differential pressure between the overhead pressure and the condenser pressure and admixing a portion of a non-condensable vapor stream with the partially condensed stream to maintain the overhead pressure in the fractionation zone.

20. The control system of claim 19 further comprising measuring the warm exit zone pressure and admixing a portion of the warm exit stream with the cooled hot exit stream as required to maintain the warm exit zone pressure.

21. The control system of claim 20 further comprising measuring the hot exit zone pressure and admixing a portion of the overhead stream with the hot exit stream to maintain a stable hot exit zone pressure.

22. The process of claim 19 wherein the condensable overhead stream is an overhead stream selected from the fractionation of benzene, toluene, xylene, ethylbenzene, cumene, and petroleum naphtha.

23. The process of claim 22 wherein the overhead stream comprises a temperature above about 80° C.

24. The control system of claim 19 wherein the non-condensable vapor stream is selected from the group consisting of the overhead stream, an external non-condensable stream and mixtures thereof.

25. The control system of claim 24 wherein the external non-condensable stream is selected from the group consisting of nitrogen, argon, methane, carbon dioxide, ethane, hydrogen and mixtures thereof.

26. The control system of claim 19 further comprising measuring a hot exit stream pressure and admixing an inert non-condensable vapor stream with the hot exit stream to maintain a stable hot exit zone pressure.

* * * * *